Dec. 24, 1968  H. HESSE  3,417,795
PRESSURE RELIEF VALVE
Filed Nov. 24, 1965  4 Sheets-Sheet 1

Dec. 24, 1968   H. HESSE   3,417,795
PRESSURE RELIEF VALVE

Filed Nov. 24, 1965   4 Sheets-Sheet 2

United States Patent Office 3,417,795
Patented Dec. 24, 1968

3,417,795
PRESSURE RELIEF VALVE
Holger Hesse, Skovtoftebakken 19,
Copenhagen-Virum, Denmark
Filed Nov. 24, 1965, Ser. No. 509,540
Claims priority, application Great Britain, Dec. 1, 1964,
48,782/64
9 Claims. (Cl. 137—514)

ABSTRACT OF THE DISCLOSURE

A relief valve for breathing apparatus having means tending to hold a movable valve element in a closed position at any gas pressure lower than a threshold pressure and means adapted at least temporarily to retain the valve element in the open position to which it moves upon the application of a pressure equal to or higher than the threshold pressure. The latter means includes an aperture extending through the body of the valve opposite the valve inlet port, a bellows having a closed end carrying the movable valve element and an open end sealingly attached about said aperture, and check valve means permitting substantially unrestrictive flow of fluid from the interior of the bellows through the open end thereof and through said aperture when the bellows is being compressed and restricting return flow of fluid into the interior of the bellows when the bellows is being expanded.

---

Figure 1:
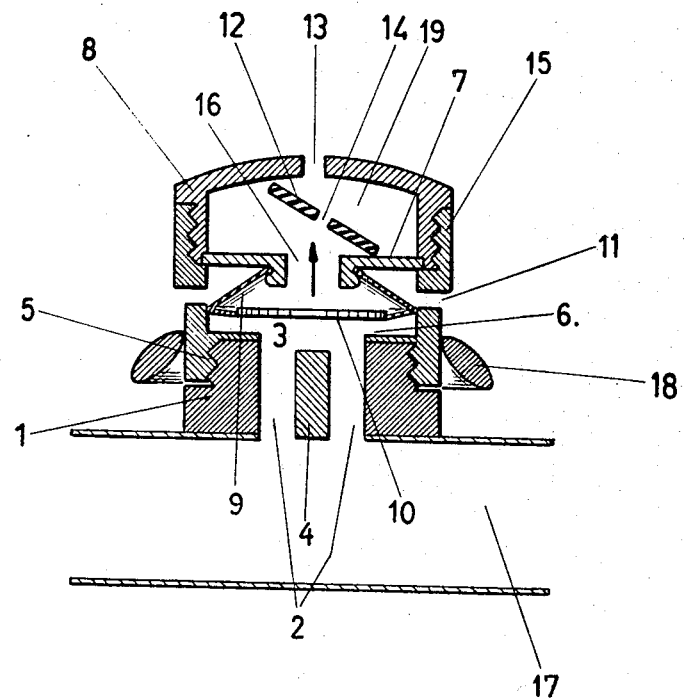

This invention relates to valves for use in breathing apparatus. Modern resuscitating equipment adapted to supply breathing air, oxygen or mixtures of such gases to the lungs of an unconscious person as well as narcosis apparatus adapted to administer anaesthetic gases to the respiratory ducts of a patient are usually provided with valve means controlling the conditions under which gas is supplied to the patient. As now widely used such valves comprise valve elements adapted under certain working conditions to move in relation to valve element seating means to open a direct communication between a source of treating gas and a breathing mask placed over the mouth and nose or even a tube inserted into the airway of the patient. Obviously precautions must be taken to avoid blocking of such valve in a position in which a movable breathing valve element closes a valve outlet causing the lungs of the patient to become subjected to an uninterrupted excessive gas supply pressure. This blocking may not be a problem to the skilled operator but less experienced first-aid personnel and anaesthetists often become embarassed when blocking occurs. Blocking may also be a problem when occurring during the use of an automatic ventilator in a non-rebreathing system.

Depending on the type of control valve involved, the provision of a conventional excess-pressure relief valve will not eliminate such blocking conditions and the risk caused thereby.

By the provision of a safety valve opening at a predetermined threshold pressure it is possible to limit to a maximum the pressure at which a state of blocking may occur but the mere relief of excess pressure may not be sufficient to allow the non-blocked state of the breathing valve to be restored. The reason for this is that the blocking of breathing valves takes place on pressure levels above those on which valve element biasing means such as a spring are designed to operate during normal conditions. Such a spring or equivalent biasing means cannot be dimensioned in respect to an elevated pressure level such as involved during blocking because there is a certain—rather low—limit value beyond which the force of the return spring or the like used in a breathing valve must not be increased, this limitation being due to the fact that the spring or other return means must not appreciably interfere with the patient's spontaneous inhalation from the air supply duct of the breathing valve. Thus, while a normal pressure relief valve may be effective to prevent the blocking pressure from exceeding a limit value it will not be effective to reduce the blocking pressure sufficiently below said limit value to enable the return spring or equivalent element to reposition the valve element of the breathing valve to a position permitting continued deblocked function.

Considering the operating requirements as explained above it will be appreciated that ordinary pressure relief valves loaded by springs or by gravity are ineffective because rather than lowering the blocking pressure to an extent definitely removing the state of blocking they tend to stabilize the pressure at the set relief valve or may even allow the pressure to rise further due to the increased resistance offered by the loading spring after initial opening. It is known that a pressure relief valve comprising a magnetically biased valve element at least theoretically would act to lower the pressure in the air system to a value below the preset relief pressure at which the valve element is lifted-off from its seat by air pressure flow overcoming the holding power of a magnet. However, in practice, it has been found that not even magnetic valves will lower the pressure in the gas flow system sufficiently to guarantee the definite removal of the blocking condition in the air breathing valve or the like, this inability of magnetically controlled valves being due to the fact that before the pressure in the system has dropped sufficiently the airflow past the magnetically biased valve element of the relief valve has become so weak that the valve closes while the pressure level within the system is still too high.

The present invention is concerned with means for definitely relieving a state of blocking in a breathing valve interposed between a gas supply and the respiratory ducts of a patient.

For this purpose, there is provided according to the invention for use in communication with the air flow system of a breathing valve a relief valve adapted to open at a predetermined threshold gas pressure, said relief valve comprising means tending to hold a movable valve element in a closing position at any gas pressure lower than said threshold pressure and means adapted at least temporarily to retain the valve element in an opening position to which said valve element has been shifted under the action of a gas pressure equal to or higher than said threshold pressure, said holding means thus being effective, after appearance of said threshold pressure, to enable the pressure in the communicating breathing and relief valves to return to a predetermined low value at which the blocking condition in the breathing valve is definitely relieved.

Obviously, said predetermined low value will be chosen in respect to the working characteristics of the breathing valve so as to enable the return spring or equivalent valve element biasing means of the breathing valve to reposition the valve element of the breathing valve from a blocking or breathing valve outlet closing position, the gas pressure at said predetermined low value being insufficient to hold the movable element of the breathing valve in a blocking or outlet closing position against the action of the return spring or the like.

Figure 2:
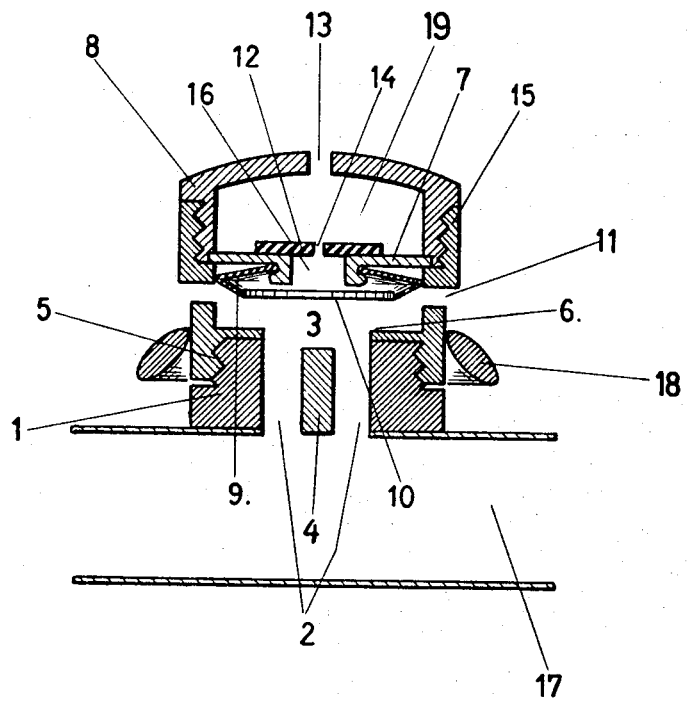
Figure 3:
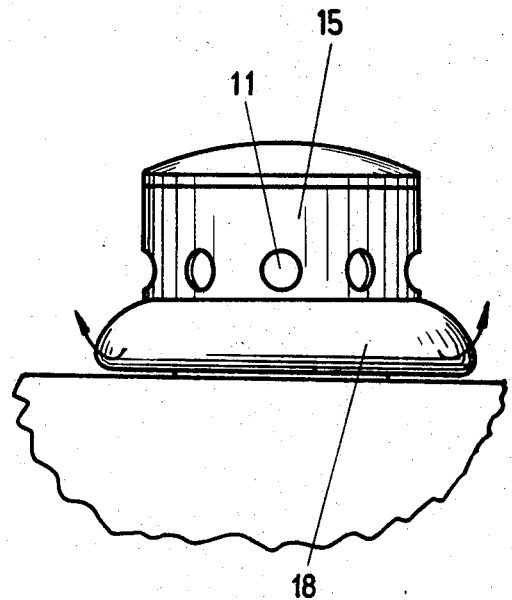
Figure 4:
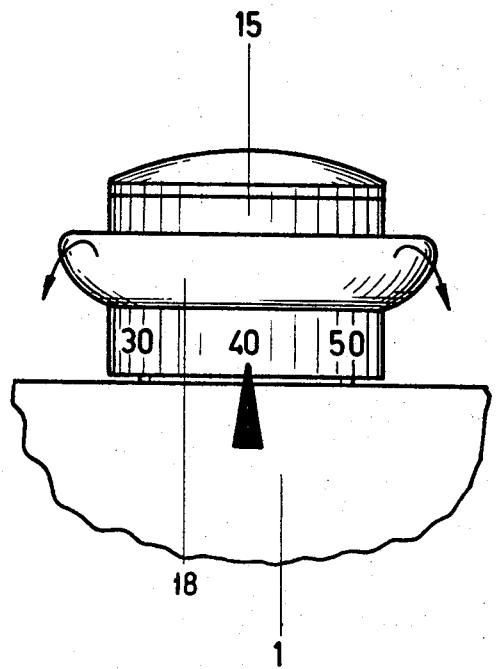

With a view of explaining the invention in greater detail reference is now made to a specific embodiment of a pressure relief device incorporating the present invention and shown in the attached drawings in which FIGS. 1 and 2 are axial sections of the device with the movable parts thereof shown in either of two working positions and FIGS. 3 and 4 are side elevations of the device with an outer closing element in either of two alternative functional positions.

The pressure relief device is shown in combination with the air flow system of a breathing valve of arbitrary type, said system here being represented by an air duct 17 forming part of a system through which air is supplied to a breathing valve or the like and in which a blocking pressure may develop.

The pressure relief device as shown comprises a housing composed of threadedly connected, substantially cylindrical parts, viz. a base 1, an annular wall portion 15 threadedly connected at 5 to said base 1 and a cap 8 screwed into the free end of said annular wall portion 15. Inserted into a groove formed between the end of the skirt of said cap 8 and a shoulder formed on the inside of said annular wall portion 15 is a partition wall 7 having a central aperture 16 surrounded on the side facing the base 1 by a circular flange integrally formed on said partition wall 7. A bore 2 communicating with said air duct 17 extends axially through said base 1 in concentric relation to said aperture 16 and to a port opening 13 extending centrally through the end wall of said cap 8. Bore 2 has a diameter in excess of that of aperture 16 the diameter of which in turn is greater than that of port opening 13. Centrally within bore 2 a cylindrical magnet 4 is supported by suitable means (not shown) in fixed relation to said base 1. Spaced peripherally about the central portion of said annular wall portion 15 are a series of ports 11 connecting the chamber 3 formed within the annular wall portion 15 between said base 1 and partition wall 7 to the atmosphere, the chamber 19 defined within said cap 8 by said partition wall 7 being in open communication with the atmosphere through said port opening 13.

A radial flange portion 6 extending inwardly from the inner surface said annular wall portion 15 and overlying the free end surface of said base 1 at said chamber 3 forms a seat for a valve disc 10 of paramagnetic material floatingly supported within chamber 3 on the closed flat end surface of a resilient bellows 9 the open circular neck portion of which is in sealing engagement with the circular flange surrounding the aperture 16 in partition wall 7.

The arrangement further comprises a disc 12 having a diameter greater than that of the central aperture 16 and movable within chamber 19 between a position in which it overlies aperture 16 and a position permitting free flow of air from within the bellows into chamber 19. A central bleed port 14 in disc 12 permits restricted flow of air from chamber 19 into the hollow interior of said bellows 9 when the disc 12 is seated on the upper side of partition wall 7 in a position overlying aperture 16. Means not shown are provided preventing disc 12 from assuming positions in contact with partition wall 7 in which aperture 16 is not fully closed except as to the air flow communication provided by bleed port 14. The effective area of the bleed port may be adjustable. Suitable means for these purposes will be readily apparent to the expert.

The operation of the device as described so far is as follows. Assuming that a predetermined blocking pressure level has developed in the air flow system here represented by conduit 17, the pressure relief device described above will react as shown in FIG. 1 the adjustment of the parts and the biasing force exerted by magnet 4 being such as to permit valve disc 10 to become unseated from its seat 6. Thereby, on the one hand, the predetermined blocking pressure prevailing in conduit 17 will be released by flow of air from conduit 17 through bore 2, past the edges of disc 10 into chamber 3 and from there through ports 11 to the atmosphere. On the other hand, while disc 10 is lifted from its position on seat 6 and is being moved to the opposite end position illustrated in FIG. 2 it will cause bellows 9 to be compressed causing the air contained within the fully expanded bellows to be expelled through aperture 16 in the direction of the arrow shown in FIG. 1 and to displace disc 12 substantially as shown in FIG. 1, the flow area offered by bleed port 14 being too small to accommodate without displacement of disc 12 the flow surge passing through the relatively wide aperture 16 upon sudden forced compression of said bellows 9. The surge flow of air from the interior of the bellows will be discharged from chamber 19 through port opening 13. At the end of the compression of the bellows when the flow from the interior thereof has ceased disc 12 will be returned by gravity or other means or even by suction to its normal position overlying aperture 16 as shown in FIG. 2. The action of magnet 4 attracting valve disc 10 and tending to restore bellows 9 to a position in which valve disc 10 is in seating contact with seat 6 will now be opposed by the suction force necessary to draw air from chamber 19 through bleed port 14 into the inner cavity of the bellows. By properly dimensioning the area of bleed port 14 a predetermined delay in the return movement of valve disc 10 to the seating position on seat 6 may be obtained whereby pressure in the breathing air flow system represented by conduit 17 will be permitted to fall under said predetermined level at which valve disc 10 is forced from its seat 6 against the action of magnet 4. Thus, only when the bellows 9 is again completely filled with air and valve disc 10 is again firmly seated on seat 6 the pressure relief cycle is definitely terminated and any blocking that may have occurred in the breathing valve is definitely removed. The action is fully automatic.

As shown in the drawings a flat rubber ring 18 here shown to have elliptical cross-section is placed outwardly around the annular wall portion 15 in a position between said base 1 and said ports 11. Ring 18 has an inner diameter slightly less than the outside diameter of the annular wall portion 15 and, accordingly, when placed over the annular wall portion 15, as shown, ring 18 will be deformed to either of the alternative positions shown respectively in FIGS. 1 to 3 and FIG. 4. While in the position shown in FIGS. 1 to 3 the ring 18 will not interfere with air flow through ports 11, it will close these ports when turned to the reverse position shown in FIG. 4 whereby the pressure relief valve is put out of action. This may be desirable under certain working conditions in the breathing air supply circuit, for example, when high pressures are to be artificially introduced into the air system under the control of the operator.

The holding action of magnet 4 is a function of the spacing between the opposed surfaces of magnet 4 and valve disc 10. The preferred construction of a pressure relief device as described above enables this spacing to be adjusted by varying the depth to which the annular wall portion 15 carrying valve seat 6 is screwed onto base 1. While in FIGS. 1 and 2 the threaded connection 5 between said parts is fully tightened and accordingly the spacing between magnet 4 and valve disc 10 is at a minimum, the holding effect and relief pressure accordingly being at a maximum, the relief pressure level may be lowered by reducing the relative holding power of the magnet 4 in relation to valve disc 10, such reduction being easily and conveniently obtained by unscrewing the threaded connection 5 between the annular wall portion 15 and the base 1. As shown in FIG. 4 the device may be calibrated to facilitate adjustment, numerical indications provided on the outer circumference of said annular wall portion 15 being readable against a pointer or mark provided on said base 1.

The invention is not restricted to the specific embodiment shown and described. Any equivalent relief valve construction, biasing means, actuating means and return delay means may be used instead of those specifically described. For example, valve disc 10 is not necessarily magnetically biased and may be adapted to be returned to its position on seat 6 by spring action. While in the preceding description a pneumatic system in open communication to the atmosphere has been described as a means of delaying the return of valve disc 10 onto its seat 6 it will obviously also be possible to use hydraulic systems for the same purpose. For example, port opening 13 may be in communication with a resiliently extensible bladder of bellows whereby a closed hydraulic system is obtained. When bellows 9 is compressed a liquid such as oil filling the hydraulic system including the chamber 19 will be expelled from the interior of the bellows 9 lifting disc 12 from aperture 16 and causing the bladder or bellows attached to port opening 13 to extend. The return flow of the expelled oil into bellows 19 will take place in a way similar to that described in connection with the pneumatic system shown with a delay depending on the flow area of bleed port 14.

The pressure relief device of the present invention may be combined with portable breathing or gas supply equipment. In this case and in similar applications the relief valve may form an attached or integral part of a breathing valve body of basically conventional three-branch type, having one branch attached to a source of pressurized air or gas, another branch forming an outlet to atmosphere and a third branch leading to the respiratory system of the patient, the breathing valve body in this case being provided with a fourth branch communicating with the inlet bore 2 of a pressure relief device of the present invention.

These and other modifications within the limits of mechanical and functional equivalence are intended to be comprised by the attached claims.

What I claim is:

1. For use in communication with a breathing air flow system in which blocking of a breathing valve may occur, a relief valve adapted to open at a predetermined threshold gas pressure, said relief valve comprising a valve body enclosing a chamber, an inlet port extending through said body into said chamber and adapted to be outwardly connected to said air flow system, at least one outlet port extending through said valve body and forming a communication between said chamber and the atmosphere, a valve seat surrounding the inner end of said inlet port within said chamber, a valve element movable within said chamber between an inlet port-closing seated position on said seat and unseated positions permitting flow of air through said inlet port, said seat, said chamber and out through said outlet port, valve element holding and returning means acting to hold said valve element in its seated position against any air pressure prevailing in said inlet port less than said predetermined threshold pressure and tending to return said valve element to its seated position after restoration of an air pressure less than said threshold pressure in said inlet port, and valve element return delaying means temporarily counteracting the returning action of said valve element holding and returning means after a preceding pressure-releasing actuation of said device, said delaying means comprising an aperture extending through said valve body substantially opposite to the inner end of said inlet port, a bellows which is compressible between opposite ends, one of which is closed and the other one of which is in open communication with the interior of said bellows, said closed end carrying said valve element in said seated position when said bellows is expanded and in unseated position when said bellows is compressed between said ends, said open end being sealingly attached around said aperture, and check valve means permitting substantially unrestricted flow of fluid from the interior of said bellows through the open end thereof and through said aperture when said bellows is being compressed and restricted return flow of fluid into the interior of said bellows when said bellows is being expanded.

2. The relief valve as claimed in claim 1 in which said check valve means is a disc normally held in a position to close said aperture outwardly of said chamber and adapted to be lifted-off from said position by air expelled from the interior of said bellows to permit substantially unrestricted air flow through said aperture and to return to said position after cessation of air flow from said bellows, said disc being provided with a bleed port dimensioned to delay refilling of the bellows with air from the atmosphere during expansion of said bellows under hte action of said valve element holding and returning means.

3. The relief valve as claimed in claim 1 in which a partition wall extends transversely through said valve body to define therein two compartments one of said compartments forming said chamber in which the inner end of said inlet port is positioned substantially opposite to said partition wall, said aperture being provided in said partition wall substantially opposite to the inner end of said inlet port, said valve body having a port hole establishing communication between the other one of said compartments and the atmosphere, said check valve means being a disc disposed within said other compartment and normally taking a position to close said aperture and adapted to be lifted-off from said position by air expelled from the interior of said bellows to permit substantially unrestricted air flow through said aperture and to return to said position after cessation of air flow from said bellows, said disc being provided with a bleed port dimensioned to delay refilling of the bollows with air from the atmosphere during expansion of said bellows under the action of said valve element holding and returning means.

4. The relief valve as claimed in claim 1 in which said valve element is of a material adapted to be attracted by magnetic force in which said valve element holding and returning means are magnet means disposed in a position to draw said magnet element against said seat.

5. For use in connection with a breathing air flow system, a relief valve having a valve body enclosing a cavity, a partition wall dividing said cavity into a valve chamber and a check valve compartment, an inlet port extending through said valve body into said valve chamber and adapted to be connected to said air flow system, at least one outlet port establishing communication between said valve chamber and the atmosphere, a port establishing communication between said check valve compartment and the atmosphere, an aperture extending through said partition wall, a bellows having an open end sealingly attached to said aperture and having its closed body disposed within said valve chamber, a valve element carried by the body of said bellows within said valve chamber opposite to the inner end of said inlet port, means urging said valve element towards an inlet port closing position, and a check valve element within said compartment permitting flow of air through said aperture when said bellows is being compressed and closing said aperture when said bellows is being expanded, said check valve element having a bleed port permitting restricted flow of air from said check valve compartment into said bellows during expansion of said bellows.

6. The relief valve as claimed in claim 5 in which said valve body is composed of at least two parts in threaded engagement with each other, a valve element seat being provided on one of said parts and said valve element urging means being provided on the other one of said parts whereby the tension exerted by said valve element urging means on said valve element in its inlet port closing seated position may be varied by varying the depth of the threaded engagement between said parts.

7. The relief valve as claimed in claim 5 in which said valve element is of a material adapted to be attracted by magnetic force and in which said valve element urging means are magnet means.

8. For use in connection with a breathing air flow system, a relief valve having a cylindrical valve body enclosing a cavity, a partition wall dividing said cavity into a valve chamber and a check valve compartment, an inlet port extending through said valve body into said valve chamber and adapted to be connected to said air flow system, a plurality of outlet ports spaced around a circumference of said valve body and establishing communication between said valve chamber and the atmosphere, a port establishing communication between said check valve compartment and the atmosphere, an aperture extending through said partition wall, a bellows having an open end sealingly attached to said aperture and having its closed body disposed within said valve chamber, a valve element carried by the body of said bellows within said valve chamber opposite to the inner end of said inlet port, means urging said valve element towards an inlet port closing position and a rubber ring having a flat elliptical cross-section with the long axis of the ellipse extending radially and having an inner diameter less than the outer diameter of said valve body, said rubber ring when placed around the valve body being selectively deformed into contact between either of its side surfaces with respectively a zone of the valve body surface spaced from said circumference and a zone of the valve body surface containing said circumference.

9. The relief valve as claimed in claim 8 in which said valve body is composed of at least two parts in threaded engagement with each other, a valve element seat being provided on one of said parts and said valve element urging means being provided on the other one of said parts whereby the tension exerted by said valve element urging means on said valve element in its inlet port closing seated position may be varied by varying the depth of the threaded engagement between said parts, cooperating indexing marks being provided on the outside surface of said two threadedly engaged valve body parts to indicate the depth of threaded engagement between said parts.

References Cited
UNITED STATES PATENTS

| 200,572 | 2/1878 | Ruge | 137—223 X |
| 868,130 | 10/1907 | Russell | 137—381 X |
| 2,625,171 | 1/1953 | Wood | 137—525 X |
| 2,638,114 | 5/1953 | Wetzel | 137—381 X |
| 2,878,828 | 3/1959 | Klafstad | 137—478 |
| 2,894,532 | 7/1959 | Gaylord | 137—510 X |
| 3,177,894 | 4/1965 | Camp | 137—514 |

FOREIGN PATENTS 829,927  4/1938  France.

WILLIAM F. O'DEA, *Primary Examiner.*

D. J. ZOBKIW, *Assistant Examiner.*

U.S. Cl. X.R.

251—55, 65